United States Patent Office 3,095,438
Patented June 25, 1963

3,095,438
SYMMETRICAL DIALKYL DIAMIDODITHIO-
PYROPHOSPHATES
Kenneth C. Kauer, Midland, Mich., assignor to The Dow
 Chemical Company, Midland, Mich., a corporation of
 Delaware
No Drawing. Filed Aug. 2, 1961, Ser. No. 128,664
7 Claims. (Cl. 260—461)

The present invention is directed to symmetrical dialkyl diamidodithiopyrophosphates corresponding to the formula

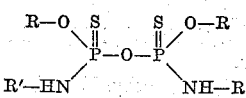

In this and succeeding formulae, R represents methyl or ethyl and R' represents methyl, ethyl or propyl. These novel compounds are liquid or crystalline solid materials which are somewhat soluble in many common organic solvents and of low solubility in water. The compounds are useful as parasiticides and are adapted to be employed as active toxic constituents of compositions for the control of many mite, insect, and bacterial and fungal organisms such as aphids, ticks, beetles, worms, flies and ascarids.

The new compounds are prepared by reacting together water, a tertiary amine and an O-alkyl phosphoramidochloridothioate corresponding to the formula

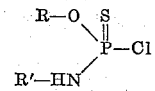

The reaction is somewhat exothermic and takes place readily at the temperature range of from 10° to 60° C. with the production of the desired product and chloride of reaction. This chloride appears in the reaction mixture as the hydrogen chloride salt of the tertiary amine, such as pyridine hydrochloride or triethyl amine hydrochloride. The amounts of the reagents to be employed are not critical, some of the desired products being obtained when employing any proportion of the reagents. Good results are obtained when employing about two molecular proportions of each of the phosphoramidochloridothioate and tertiary amine and about one molecular proportion of water. In the preferred method of operation, optimum yields are obtained when employing a small excess of water. In carrying out the reaction, the reactants are mixed and contacted together in any convenient fashion and maintained for a period of time in the contacting temperature range to insure completion of the reaction. The temperature may be controlled by regulating the rate of contacting the reactants and by external cooling. Following the reaction, the desired product is separated by conventional procedures. In a convenient method of isolation, the reaction mixture is extracted with a solvent such as methylene chloride, the solvent extract washed with water and the solvent thereafter removed from the washed extract to obtain the desired product as a residue.

The following embodiments merely illustrate the invention and are not to be construed as limiting.

*Embodiment 1.—Symmetrical O,O-Diethyl N,N'-Dimethyl Diamidodithiopyrophosphate*

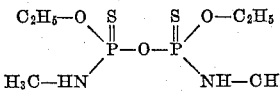

A mixture consisting of 19.8 grams (0.25 mole) of pyridine and 2.5 grams (0.139 mole) of water was added portionwise with stirring and cooling to 41 grams (0.24 mole) of O-ethyl N-methyl phosphoramidochloridothioate. The addition was carried out over a period of 45 minutes and at a temperature of from 22° to 40° C. Stirring was thereafter continued for two hours at a temperature of from 35° to 40° C. and the mixture thereafter set aside for 16 hours at room temperature to insure completion of the reaction. The reaction mixture was then extracted with 50 milliliters of methylene chloride, the solvent extract washed with water and the solvent thereafter removed from the washed extract by fractional distillation under reduced pressure at gradually increasing temperatures up to a temperature of 45° C. at one millimeter pressure. As a result of these operations, there was obtained a symmetrical O,O-diethyl N,N'-dimethyl diamidodithiopyrophosphate product as a liquid residue having a density of 1.2499 at 25° C., a refractive index n/D of 1.5232 at 25° C. and phosphorus and sulfur contents of 20.05 percent and 21.9 percent, respectively, as compared to theoretical contents of 21.2 percent and 21.9 percent.

*Embodiment 2.—Symmetrical O,O-Diethyl N,N'-Diisopropyl Diamidodithiopyrophosphate*

A mixture consisting of 41 grams (0.52 mole) of pyridine and 4.85 grams (0.27 mole) of water was added portionwise with stirring and cooling to 100.8 grams (0.5 mole) of O-ethyl N-isopropyl phosphoramidochloridothioate. The addition was carried out over a period of 4 hours and at a temperature of from 25° to 35° C. Stirring was thereafter continued for 3 hours at a temperature of from 30° to 38° C. and the mixture thereafter set aside overnight at room temperature to insure completion of the reaction. The reaction mixture was then extracted with methylene chloride, the solvent extract washed with water and the solvent thereafter removed from the washed extract by fractional distillation as previously described up to a temperature of 60° C. at 5 millimeters pressure. As a result of these operations, there was obtained an O,O-diethyl N,N'-diisopropyl diamidodithiopyrophosphate product as a liquid residue having a density of 1.1418 at 25° C., a refractive index n/D of 1.5008 at 25° C. and a sulfur content of 18.74 percent as compared to theoretical content of 18.35 percent.

*Embodiment 3.—Symmetrical O,O-Dimethyl N,N'-Diethyl Diamidodithiopyrophosphate*

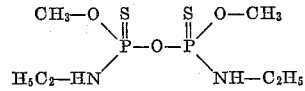

A mixture consisting of 30.5 grams (0.385 mole) of pyridine and 3.5 grams (0.195 mole) of water was added portionwise with stirring and cooling to 65 grams (0.376 mole) of O-methyl N-ethyl phosphoramidochloridothioate. The addition was carried out over a period of 1.5 hours and at a temperature of from 20° to 30° C. The reaction mixture was then set aside at room temperature for about 66 hours to insure completion of the reaction. Following this period, the reaction mixture was diluted with 75 milliliters of methylene chloride, the solvent extract washed with water and the solvent thereafter removed from the washed extract by fractional distillation in the usual fashion up to a temperature of 55° C. at one millimeter pressure. As a result of these operations, there was obtained a symmetrical O,O-dimethyl N,N'-diethyl diamidodithiopyrophosphate product as a liquid residue having a density of 1.2635 at 25° C., a refractive index n/D of 1.5272 at 25° C. and a sulfur content of 22.53 percent as compared to a theoretical content of 21.9 percent.

In similar operations, other products of the present invention are prepared as follows:

Symmetrical O,O-dimethyl N,N-dimethyl diamidodithiopyrophosphate (density of 1.3439 at 25° C.; refractive index n/D of 1.5410 at 25° C.) by reacting together O-methyl N-methyl phosphoramidochloridothioate, triethyl amine and water.

Symmetrical O,O-dimethyl N,N'-diisopropyl diamidodithiopyrophosphate (melting at 91°–93° C.) by reacting together O-methyl N-isopropyl phosphoramidochloridothioate, pyridine and water.

Symmetrical O,O-diethyl N,N'-diethyl diamidodithiopyrophosphate (density of 1.1936 at 25° C.; refractive index n/D of 1.5096 at 25° C.) by reacting together O-ethyl N-ethyl phosphoramidochloridothioate, triethyl amine and water.

The novel compounds of the present invention are useful as parasiticides for the control of a number of pests. For such use, the products are dispersed on an inert finely divided solid such as chalk or talc or a finely divided solid surface active dispersing agent and the resulting products employed as dusts. Such mixtures may also be dispersed in water with or without the aid of a surface active agent and employed as sprays. In other procedures, the products are employed as active constituents in solvent solutions, oil-in-water or water-in-oil emulsions or aqueous dispersions. In representative operations, aqueous compositions containing 500 parts per million by weight of symmetrical O,O-diethyl N,N-dimethyl diamidodithiopyrophosphate give complete kills of flies, mites, Mexican bean beetles, aphids and Plum curculio.

The O-lower alkyl phosphoramidochloridothioates employed as starting materials in accordance with the teachings of the present application are prepared in known procedures by reacting two molecular proportions of a suitable amine with one molecular proportion of an O-loweralkyl phosphorodichloridothioate at a temperature of from —10° to 30° C. Upon completion of the reaction, the desired starting material is separated by conventional methods. The O-lower-alkyl phosphorodichloridothioates are prepared according to known methods by reacting phosphorus thiochloride with a suitable alkanol at a temperature of from 0° to 60° C.

I claim:
1. A compound corresponding to the formula

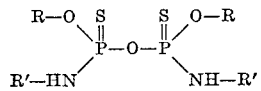

wherein R represents a member of the group consisting of methyl and ethyl and R' represents an alkyl radical containing from 1 to 3 carbon atoms, inclusive.

2. Symmetrical O,O-diethyl N,N'-dimethyl diamidodithiopyrophosphate.

3. Symmetrical O,O-diethyl N,N'-diisopropyl diamidodithiopyrophosphate.

4. Symmetrical O,O-dimethyl N,N'-diethyl diamidodithiopyrophosphate.

5. Symmetrical O,O-dimethyl N,N-dimethyl diamidodithiopyrophosphate.

6. Symmetrical O,O-diethyl N,N'-diethyl diamidodithiopyrophosphate.

7. Symmetrical O,O-dimethyl N,N'-diisopropyl diamidodithiopyrophosphate.

References Cited in the file of this patent
UNITED STATES PATENTS
2,654,784    Tolkmith _____ Oct. 6, 1953

OTHER REFERENCES

British Standards 1831, 1957, "Recommended Common Names for Pesticides," British Standards Institution, British Standard House, 2 Park St., London W.I., pp. 24 and 25.

Cheymol et al.: "Comptes Rendus" (French), vol. 251, No. 11, pp. 1171–1173, September 12, 1960.